United States Patent
Scelers

(10) Patent No.: US 7,236,872 B2
(45) Date of Patent: Jun. 26, 2007

(54) SPEED SENSOR INSTABILITY DETECTION

(75) Inventor: Herve Scelers, Illkirch-Graffenstaden (FR)

(73) Assignee: General Motors Corporation, Detroit, MI (US)

( * ) Notice: Subject to any disclaimer, the term of this patent is extended or adjusted under 35 U.S.C. 154(b) by 603 days.

(21) Appl. No.: 10/720,624

(22) Filed: Nov. 24, 2003

(65) Prior Publication Data

US 2005/0114008 A1 May 26, 2005

(51) Int. Cl.
*B60T 7/12* (2006.01)
(52) U.S. Cl. .......................................... 701/92; 701/90
(58) Field of Classification Search ............... 701/93, 701/36, 92, 82–91, 94–96; 303/141
See application file for complete search history.

(56) References Cited

U.S. PATENT DOCUMENTS

| | | | | |
|---|---|---|---|---|
| 4,809,183 A * | 2/1989 | Eckert | ........................ | 701/93 |
| 5,980,000 A * | 11/1999 | Kolbe et al. | ................ | 303/139 |
| 6,151,546 A * | 11/2000 | Schmitt et al. | ............... | 701/84 |
| 6,182,002 B1 | 1/2001 | Bauerle et al. | | |
| 6,701,243 B1 * | 3/2004 | Roll et al. | ..................... | 701/83 |

FOREIGN PATENT DOCUMENTS

| | | |
|---|---|---|
| DE | 3445966 A1 | 8/1985 |
| DE | 4235672 A1 | 4/1993 |
| DE | 342663 C2 | 9/1994 |
| DE | 102004006268 A1 | 9/2004 |

\* cited by examiner

*Primary Examiner*—Richard M. Camby
(74) *Attorney, Agent, or Firm*—Dan L. Thompson

(57) ABSTRACT

A speed sensor instability detection and correction system for use with a vehicle includes a speed sensor output variation extractor monitoring and recording change in output of a speed sensor over time. A speed sensor output variation comparison module detects speed sensor instability based on a comparison between the speed sensor output variation and a predetermined threshold. An output speed determination module selectively determines output speed in alternative ways based on whether speed sensor instability is detected.

10 Claims, 4 Drawing Sheets

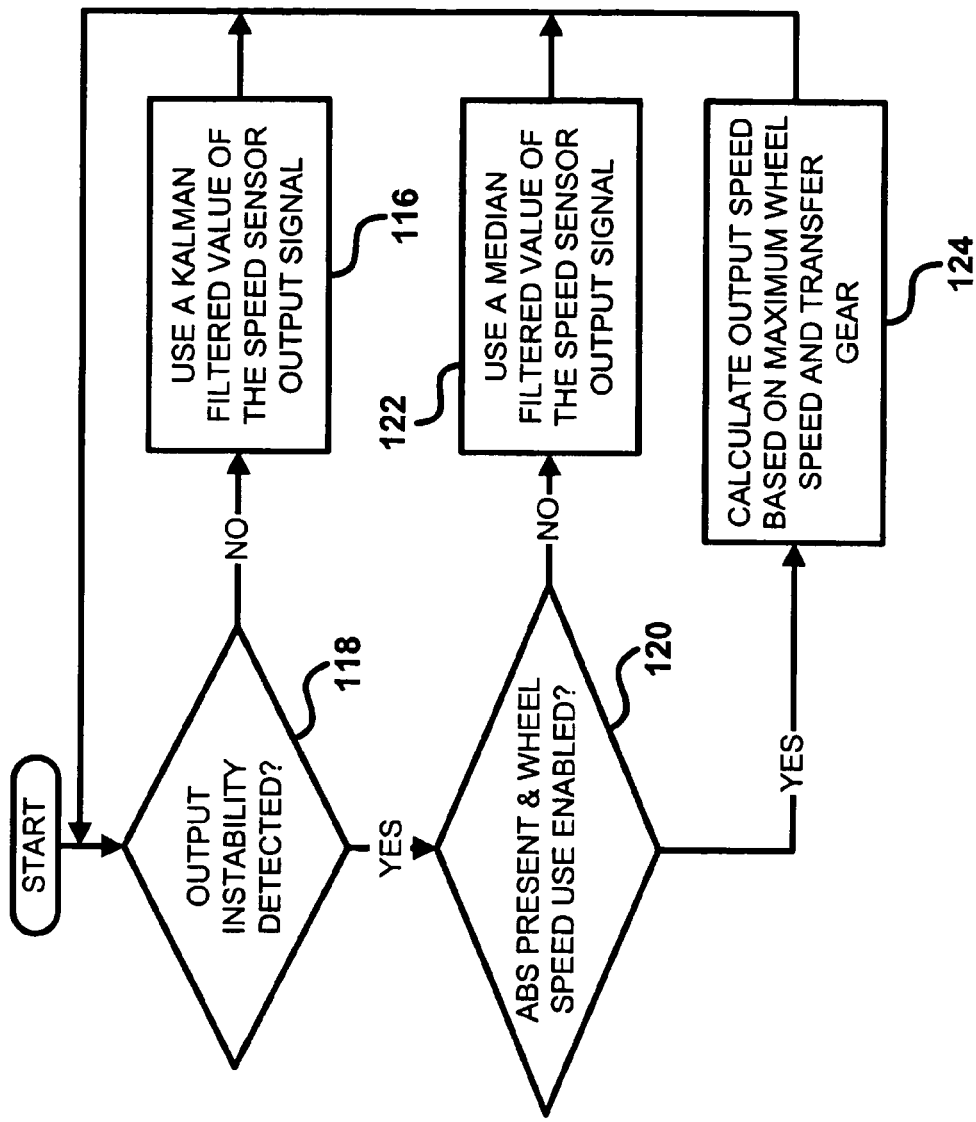

SPEED SENSOR INSTABILITY DETECTION

FIELD OF THE INVENTION

The present invention generally relates to acceleration based traction control systems, and more particularly to a control system and method for detecting wheel slip during output speed instability due to speed sensor instability.

BACKGROUND OF THE INVENTION

As a motor vehicle is being driven, it is not uncommon for one of the driven wheels to lose its grip on the road. To promote safety, traction control systems have been developed for detecting wheel spin and reducing wheel torque in response to wheel spin. In one traction control system, described in U.S. Pat. No. 6,182,002 B1, vehicle acceleration is measured and used to detect wheel spin. Another traction control system is described in U.S. patent application Ser. No. 10/601,063, filed Jun. 20, 2003, entitled "Wheel Slip Detection and Torque Management", which is commonly assigned and hereby incorporated by reference in its entirety. This traction control system uses pulley speed of a transmission, such as a continuously variable transmission (CVT), to detect wheel slippage.

In other systems, wheel speeds are monitored to detect wheel spin. For example, in vehicles having anti-lock brake systems (ABS), wheel speed sensors are used to provide information to a traction control system. As a result, wheel slippage can be detected directly.

Speed sensors also play other important roles in a motor vehicle. For example, a CVT ratio is determined as a function of throttle pedal signal, pulley speed signal, and torque converter turbine speed signal. As a result, various output speeds are combined to affect control of the vehicle. Further, some output speeds, such as pulley speed, may play multiple roles.

A problem therefore arises in each of the forgoing systems and methods when a speed sensor exhibits instability resulting, for example, from a missing tooth or electrical instability. For example, when instability occurs in the output pulley speed or turbine speed, the ratio of the CVT is perturbed. Also, when instability occurs in output pulley speed or output wheel speed, engine flare may result due to incorrect detection of wheel slippage.

SUMMARY OF THE INVENTION

In one embodiment in accordance with the present invention, a speed sensor instability detection and correction system for use with a vehicle includes a speed sensor output variation extractor that monitors and records change in output of a speed sensor over time. A speed sensor output variation comparison module detects speed sensor instability based on a comparison between the speed sensor output variation and a predetermined threshold. An output speed determination module selectively determines output speed in alternative ways based on whether speed sensor instability is detected.

In another embodiment in accordance with the present invention, a vehicle includes a speed sensor that detects a speed of a vehicle. A speed sensor instability detector detects speed sensor instability based on a change in output of the speed sensor over time. An output speed determination module employs a median filter to filter output of the speed sensor when the speed sensor instability detector indicates speed sensor instability.

In a further embodiment in accordance with the present invention, a method for detecting wheel slip based on output speed of a vehicle includes determining whether output speed instability is detected. The method also includes generating a median filtered output speed when output speed instability is detected. The method further includes determining whether wheel slip is present based on the median filtered output speed when output speed instability is detected.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a flow diagram depicting output speed determination in accordance with the present invention.

DETAILED DESCRIPTION OF THE PREFERRED EMBODIMENTS

Figure 1:
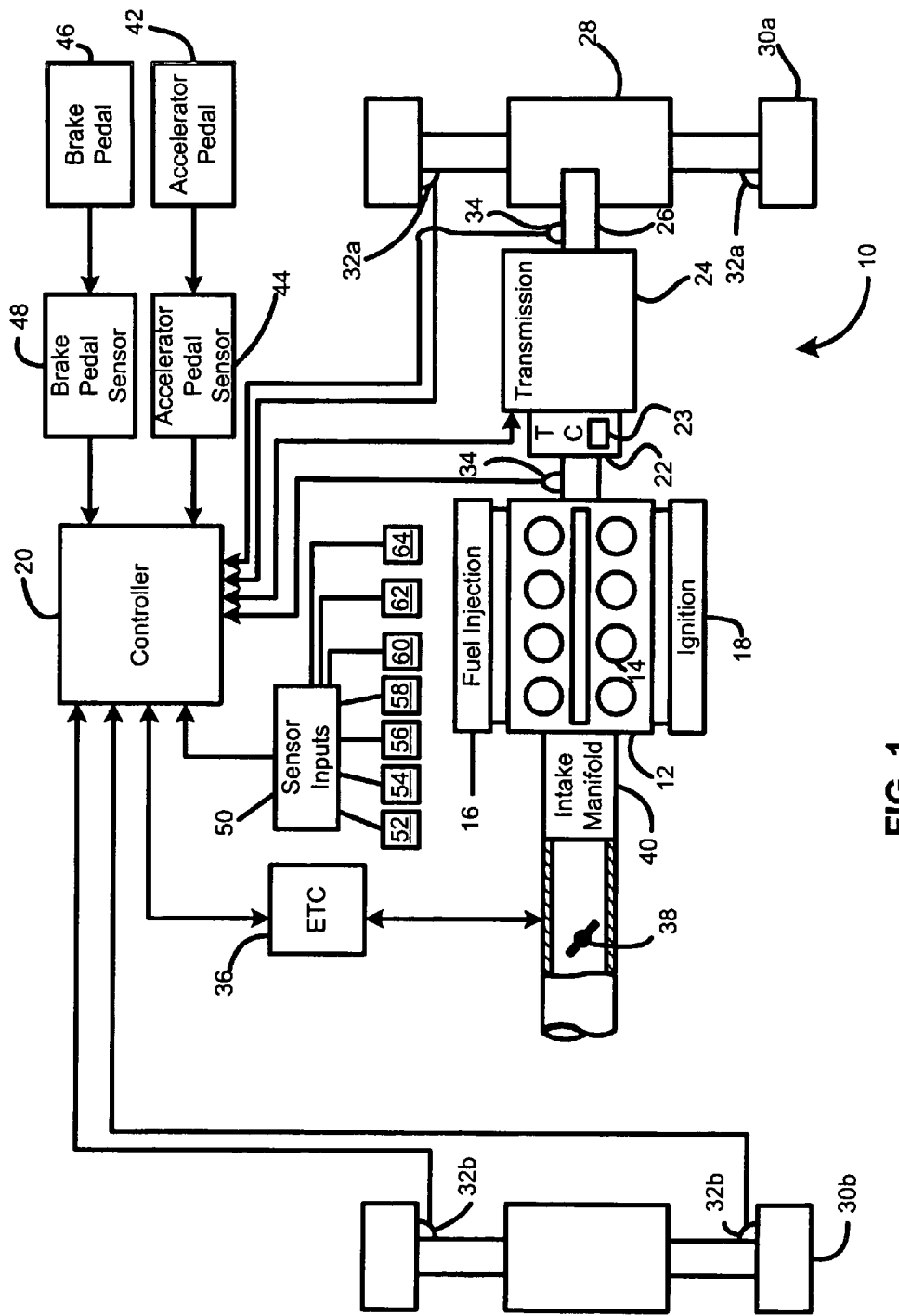
FIG. 1 is a functional block diagram of a vehicle including a traction control system according to one embodiment of the present invention.

The following description of the preferred embodiment is merely exemplary in nature and is in no way intended to limit the invention, its application, or uses. For purposes of clarity, the same reference numbers will be used in the drawings to identify similar components.

A vehicle having a traction control system in accordance with one embodiment is referred to generally in FIG. 1 by reference number 10. The vehicle 10 includes an engine 12 having a plurality of cylinders 14, each with one or more intake valves and/or exhaust valves (not shown). The engine 12 is configured with a fuel injection system 16 and an ignition system 18. An output of the engine 12 is coupled by a torque converter 22 having a torque converter clutch 23, a continuously variable transmission 24, a driveshaft 26 and a differential 28 to driven front wheels 30a. Rear wheels 30b are non-driven in the present embodiment. The transmission 24 is controlled by a controller 20.

One or more wheel speed sensors 32 transmit speed signal(s) to the controller 20. In the embodiment shown in FIG. 1, driven wheels 30a and non-driven wheels 30b have speed sensors 32a and 32b respectively. In other embodiments, fewer than four wheel speed sensors may be provided. For example, one sensor is used on one of the non-driven wheels. Shaft speed sensors 34 transmit input signals to the controller 20.

An electronic throttle controller (ETC) 36 adjusts a throttle 38 in an intake manifold 40 based upon a position of an accelerator pedal 42 and a throttle control algorithm that is executed by the controller 20. The throttle 38 adjusts an output torque that drives the wheels 30a. One or more sensors (not shown), for example a manifold pressure sensor and a manifold air temperature sensor, may be provided in the intake manifold 40.

An accelerator pedal sensor 44 generates a pedal position signal that is output to the controller 20 based on a position of an accelerator pedal 42. A position of a brake pedal 46 is sensed by a brake pedal sensor 48, which generates a brake pedal position signal that is output to the controller 20. Other sensor inputs collectively indicated by reference number 50 are used by the controller 20 for traction control. Such inputs include a signal 52 indicating engine speed, a vehicle speed signal 54, an accelerator position signal 56 and a throttle position signal 58. One such signal to the controller 20, a trans throttle signal 60, indicates throttle pressure in the transmission 24. Signals 62 and 64 indicate transmission input and output pulley speeds.

The present invention operates in the above-mentioned context to detect output speed sensor instability and take appropriate corrective action. It should be readily understood that instability in output pulley speed, output turbine speed, and output wheel speed sensor signals may be utilized in accordance with the present invention.

Figure 2:
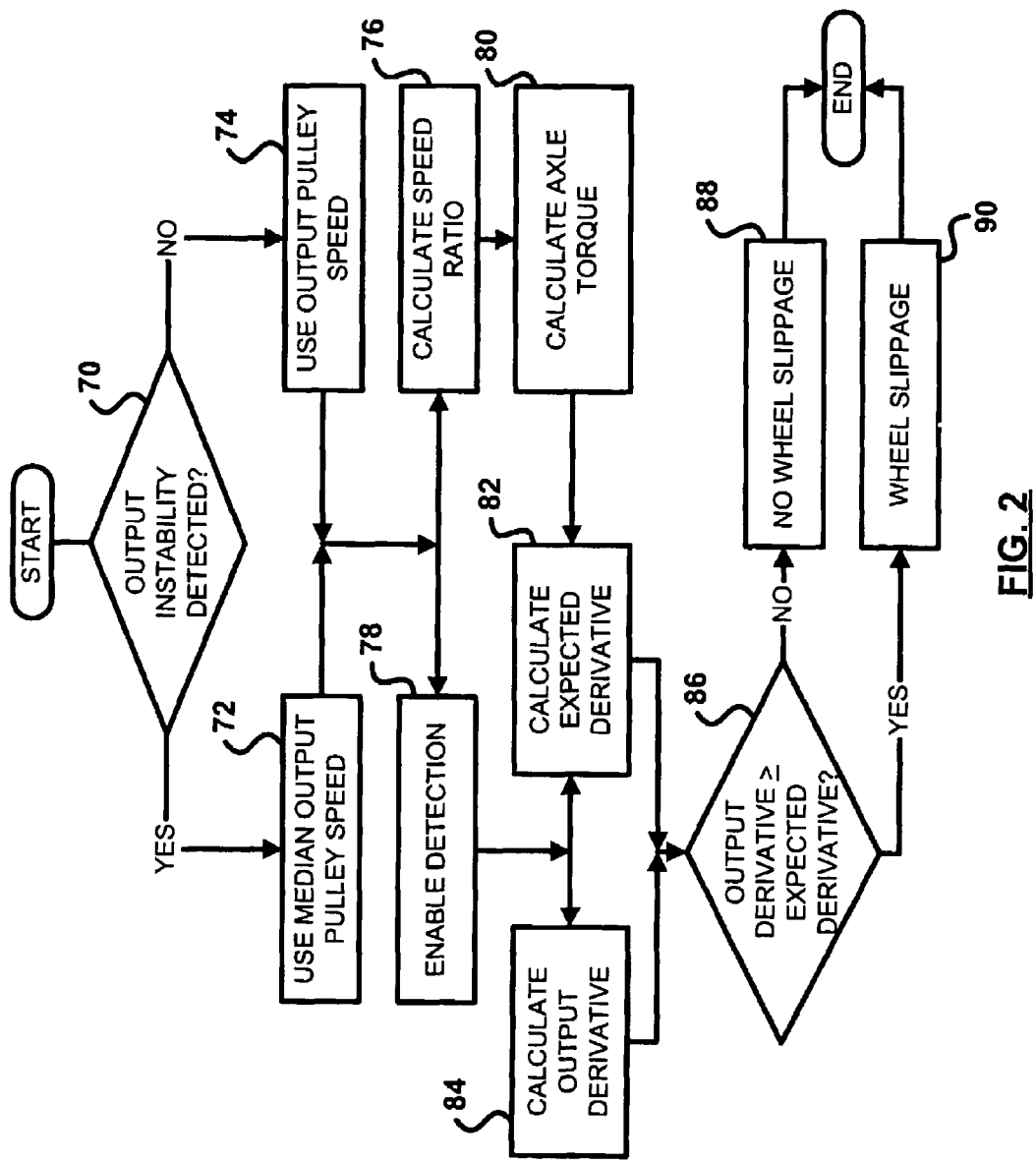
FIG. 2 is a flow diagram depicting wheel speed slippage detection in accordance with the present invention.

FIG. 2 illustrates wheel slippage detection in accordance with the present invention. Accordingly, when output speed instability is detected as at 70, a median filter is used to filter the output speed at step 72. In contrast, when output speed instability is not detected at 70, then a Kalman filter is used to filter the output speed at 74. It is envisioned that an output pulley speed sensor instability is detected at 70, and that the output pulley speed sensor signal is filtered in steps 72 and 74. Then, actual speed ratio is calculated at step 76 and continued detection of output speed instability is enabled at step 78. The actual speed ratio is used at step 80 to calculate wheel axle torque, and this wheel axle torque is used at step 82 with the output speed filter value of step 72 or 74 to determine an expected output speed derivative. In parallel, the same output speed filter value is used at step 84 to calculate an actual output speed derivative. Then, the actual output speed derivative of step 84 is compared at 86 to the expected output speed derivative of step 82. Thus, if the expected output speed derivative is greater than the actual output speed derivative, then wheel slippage is undetected at step 88. Otherwise, wheel slippage is detected at step 90.

Figure 3:
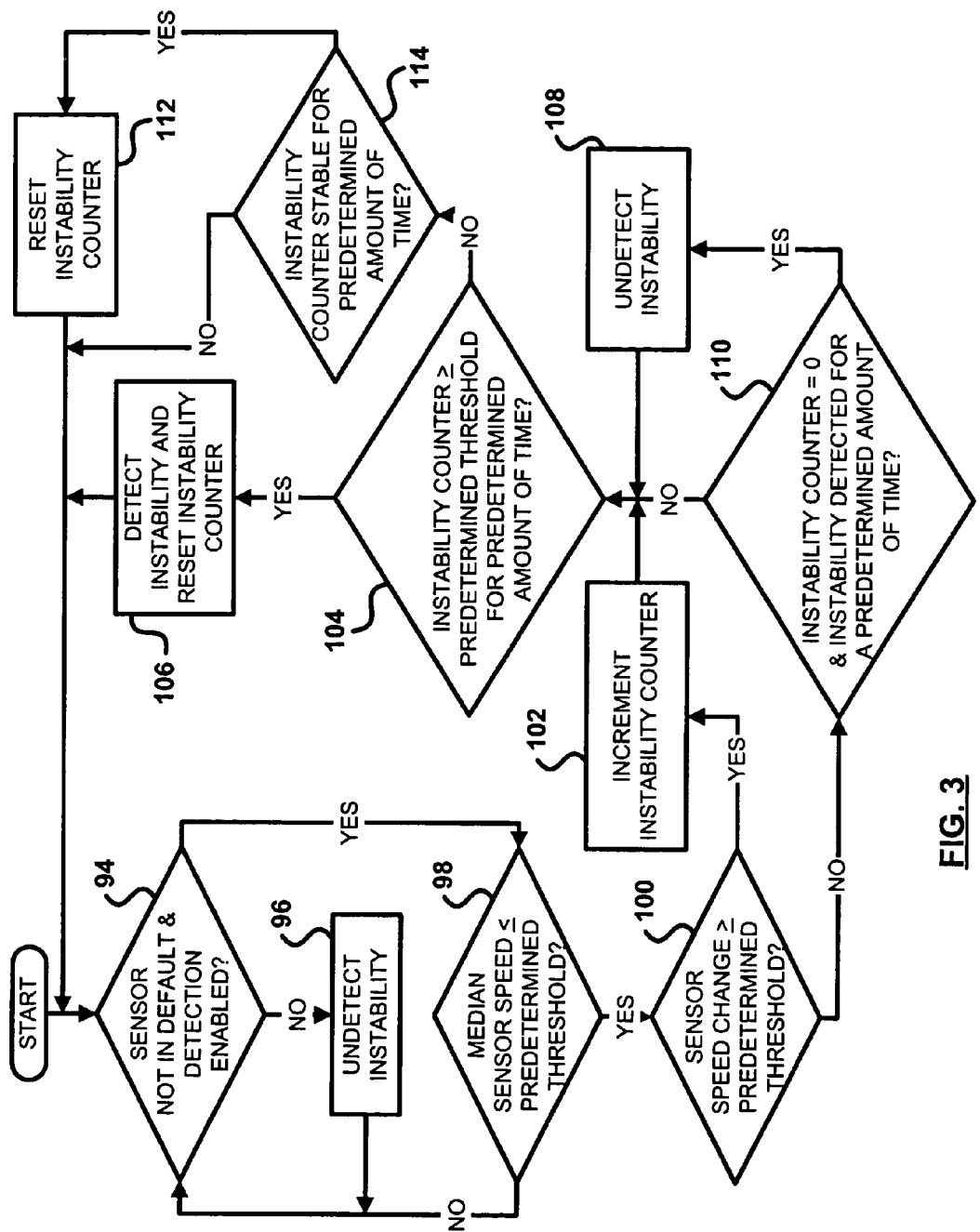
FIG. 3 is a flow diagram depicting speed sensor instability detection in accordance with the present invention.

FIG. 3 illustrates detection of output speed instability based on speed sensor instability. Accordingly, if the sensor is not in a default state and the instability detection is currently enabled as at 94, then instability detection is allowed to take place. In order to have flexibility on different applications, a selectable instability bit, or flag, is added to govern whether detection is enabled. The detection is preferably performed when the bit is set to true. However, the detection is disabled when the speed sensor has failed, and any previously detected instability is undetected at step 96 if detection is disabled for any reason.

Speed sensor instability detection according to the present invention includes comparing a median sensor speed to a predetermined threshold at 98 to ensure that instability can be differentiated from a low speed output at low speeds. Thus, if the median output speed is not too low at 98, then the absolute value of the speed sensor variation for one loop is compared to a predetermined threshold at 100. If the variation is high enough for the loop, then an instability counter is incremented at 102. Each loop represents a small amount of time, so this counter allows loop to loop instability to be tracked over time to improve accuracy. Thus, if the counter reaches a predetermined threshold during a predetermined amount of time as at 104, then instability is deemed reliably detected and the counter is reset to zero at 106. Instability then remains detected until undetected, for example, at step 96. However, instability can also be undetected at step 108 if instability has remained detected for a predetermined amount of time and the instability counter is zero as at 110. These conditions ensure that other software processes will have time to appropriately react to detected instability before it is undetected, and also that detected instability is not immediately undetected as a result of concurrently resetting the instability counter at step 106. Additionally, the counter is reset at step 112 if the counter does not exceed the threshold within the predetermined amount of time as at 114. This reset results in undetection of instability on a subsequent loop at 108 if enough time has passed at 110. It is envisioned that the detection may be employed with respect to an output pulley speed sensor, a turbine speed sensor, a wheel speed sensor, or additional types of sensors detecting speed of vehicle component or the vehicle itself.

FIG. 4 illustrates alternative procedures for determining output speed based on output speed instability detection in accordance with the present invention. Accordingly, a Kalman filter is employed at step 116 to filter the output of the speed sensor if sensor instability is not detected at 118. If an antilock brake system employing wheel speed sensors is not present at 120, then a median filter is employed to filter output of the speed sensor at 122. This filter takes a point sample and rejects the extreme value. However, the present invention is also capable of recalculating output speed based on a maximum output speed of the wheel sensors and a transfer gear of the CVT at step 124.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for detecting wheel slippage based on output speed of a wheeled vehicle, comprising:

determining whether output speed instability is detected;

generating a median filtered output speed when output speed instability is detected; and determining whether wheel slippage is present based on the median filtered output speed when output speed instability is detected.

2. The method of claim 1 wherein said determining whether output speed instability is detected includes monitoring change in a pulley speed sensor output signal over time.

3. The method of claim 2 wherein said determining whether output speed instability is detected further includes making a comparison between change in pulley speed over time and a predetermined threshold.

4. The method of claim 3 wherein said determining whether output speed instability is detected further includes detecting instability based on results of the comparison over time.

5. The method of claim 1 wherein said generating a median filtered output speed further includes filtering an output signal of a pulley speed sensor with a median filter.

6. The method of claim 1 wherein said determining whether wheel slippage is present includes calculating speed ratio based on the median filtered output speed.

7. The method of claim 6 wherein said determining whether wheel slippage is present further includes calculating wheel axle torque based on the speed ratio.

8. The method of claim 7 wherein said determining whether wheel slippage is present further includes:
   calculating an output derivative based on the median filtered output speed; and
   calculating an expected derivative based on the wheel axle torque.

9. The method of claim 8 wherein said determining whether wheel slippage is present further includes comparing the output derivative to the expected derivative.

10. The method of claim 1 further comprising:
   generating a Kalman filtered output speed when output speed instability is not detected; and
   determining whether wheel slippage is present based on the Kalman filtered output speed when output speed instability is not detected.

* * * * *